C. T. WESTLAKE.
TRAILER TRUCK FOR LOCOMOTIVES.
APPLICATION FILED OCT. 24, 1914.
1,129,930.
Patented Mar. 2, 1915.
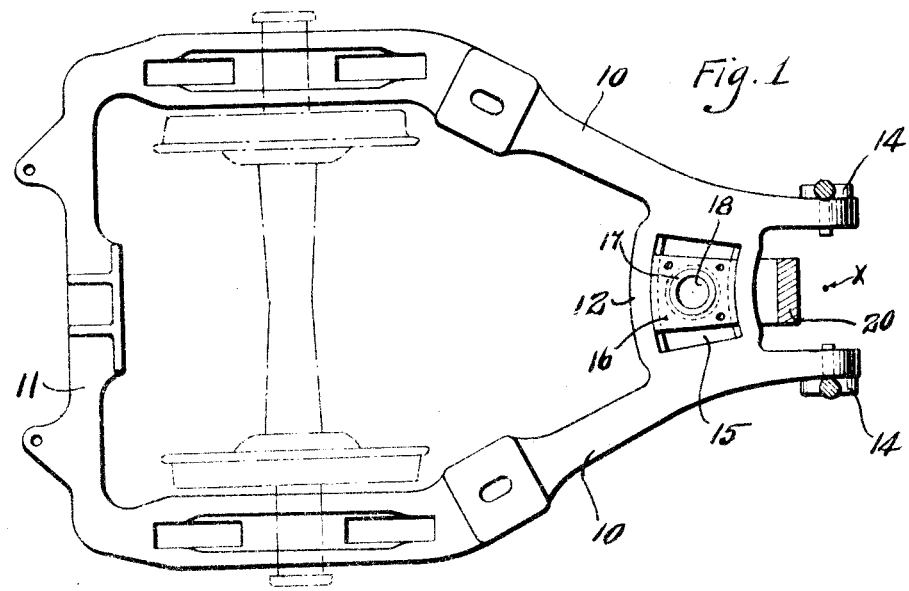
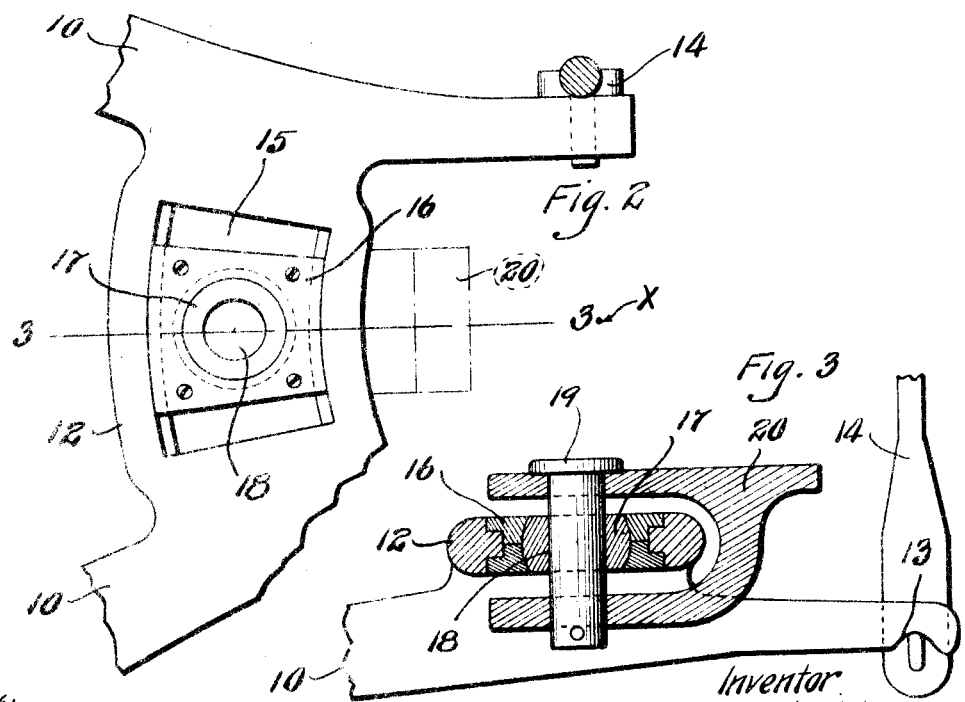
Witnesses
Inventor
Charles T. Westlake.
By _____ Att'y.

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER-TRUCK FOR LOCOMOTIVES.

1,129,930.  Specification of Letters Patent.  Patented Mar. 2, 1915.

Application filed October 24, 1914. Serial No. 868,420.

*To all whom it may concern:*

Be it known that I, CHARLES T. WESTLAKE, a citizen of the United States, residing at city of St. Louis, State of Missouri, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification, in which—

Figure 1 is a plan view of a locomotive trailer truck of my improved construction. Fig. 2 is an enlarged plan view of the forward end of the truck frame and showing the sliding pivotal connection between said truck frame and the locomotive frame. Fig. 3 is a cross section taken approximately on the line 3—3 of Fig. 2.

This invention relates generally to trailer truck frames for locomotives of the type shown in Patent No. 929,768, issued to me August 3, 1909, and No. 1,099,376, issued June 9, 1914, and more particularly to the connection between the trailer truck and the locomotive frame.

In connecting trailer truck frames, of the class to which may invention relates, to the locomotive frames, it is essential that the axis about which the truck radiates, be in direct transverse alinement with the spring hanger bearings at the forward end of the truck frame, but owing to the peculiar contour of the locomotive frame, it is not always feasible to locate the truck frame member in which the pivot bearing is located at the desired point, or in alinement with said spring hanger bearings and it is the principal object of my invention to provide a bearing between the forward portion of the truck frame and the locomotive frame, which bearing while located to the rear of the transverse line occupied by the spring hangers is constructed so as to cause the truck frame to radiate about an axis located between and in alinement with the spring hanger bearings. In constructions of this character the clearance between the spring hangers and the engine frame is very limited and permits of but slight transverse movement of said hangers so that it is essential that such transverse movement be reduced to a minimum. This I accomplish by locating the axis for the trailer truck at a point in alinement with said spring hangers and at the same time maintaining the actual bearing between the truck frame and the engine frame at a point to the rear of the transverse line occupied by said spring hangers and axis.

With the foregoing and other objects in view, my invention consists in certain novel features of construction and arrangement of parts hereinafter more fully described and claimed.

As shown in the drawings, my improved trailer truck frame comprises a pair of side members 10 and a rear rail or member 11, said parts being preferably cast integral and having formed thereon various brackets and plates adapted to receive parts which are necessarily associated with the truck frame. The forward portion of the side members 10 converge and are united by a transversely disposed member 12, the same being located a short distance to the rear of the extreme forward ends of said arms 10. The forward ends of the side rails 10 are provided in their undersides with notches or recesses 13 which serve as bearings for keys carried by the lower ends of spring hangers 14. As hereinbefore stated, the transverse movement of the lower ends of these spring hangers is very limited by reason of the proximity of the locomotive frame, and therefore, it is desirable that the trailer frame be connected to the locomotive frame so as to swing about an axis located between and in alinement with the spring hangers, and thus, as the rear portion of said trailer truck frame swings from side to side, the lower ends of the spring hangers which are connected to the forward end of the truck frame will swing through arcs which are in effect parallel with a line drawn through the longitudinal axis of the truck frame. To provide a connection between the truck frame and the locomotive frame which will bring about this particular movement, I have provided the cross piece 12 between the forward portions of the side rails 10, said cross piece being at a point where a convenient connection can be made with the locomotive frame. Formed in this cross piece is a transversely disposed arcuate slot or opening 15, the same being concentric with point X which is in alinement with and half way between the spring hanger bearings 13. Arranged to slide freely through this arcuate slot or opening and having a groove and slot connection with the edges thereof is a two-part block 16 in which is loosely mounted a bearing ring 17. The edge of this ring is rounded so that it will rock freely in the block 16, and formed through said bearing ring is an opening 18 adapted to receive a pin 19, which latter is seated in a transverse member 20 of the locomotive frame. By such construction, the block 16 is virtually a part of the locomotive frame, and by reason of the curvature of the opening 15, said truck frame will be constrained to swing radially about the point X as an axis, and consequently, the transverse movement of the lower ends of the spring hangers will be reduced to a minimum.

A trailer truck frame of my improved construction is comparatively simple, can be easily and cheaply manufactured, can be readily combined with ordinary forms of locomotive frames without necessitating extensive changes, and while the connection between the truck frame and locomotive frame is at a point substantially to the rear of the forward end of said truck frame, the lateral swing of the spring hangers which support the extreme forward end of the truck frame is reduced to a minimum.

It will be readily understood that minor changes in the size, form and construction of the various parts of my improved trailer truck frame can be made and substituted for those herein shown and described, without departing from the spirit of my invention, the scope of which is set forth in the appended claims.

I claim:

1. A trailer truck frame pivoted near one of its ends to the main frame of the locomotive and susceptible of side movement at the opposite end, the sides of said truck frame extending beyond the pivot bearing and forming spring hanger bearings and the pivot bearing for said truck frame being arranged to constrain the truck frame to travel about a point in transverse alinement with said spring hanger bearings.

2. The combination with a locomotive frame, of a trailer truck frame supported at its forward ends by spring hangers, there being an arcuate slot formed in the forward portion of said frame, a bearing block loosely mounted on said slot, and a pivot pin seated in said block and in a part of the locomotive frame.

3. The combination with a locomotive frame, of a trailer truck frame, the forward end of which is supported by spring hangers, a transversely movable bearing block mounted on the truck frame to the rear of the spring hangers, and a pivot pin seated in said bearing block and a portion of the locomotive frame.

4. The combination with a locomotive frame, of a trailer truck frame, spring hangers supporting the forward end of said truck frame, and a sliding pivotal connection between the truck frame and locomotive frame, which connection is formed so as to constrain the truck frame to swing about a point in transverse alinement with the spring hangers.

5. A trailer truck frame provided at its forward end with spring hanger bearings, a transverse member on the frame to the rear of the side bearings, and a pivot bearing block mounted for sliding movement on said transverse member, which block is adapted to receive a pivot pin seated in a fixed part of the locomotive frame.

In testimony whereof I hereunto affix my signature in the presence of two witnesses, this 12th day of October, 1914.

CHARLES T. WESTLAKE.

Witnesses:
HAL C. BELLVILLE,
OTTO V. MYERS.